United States Patent [19]

Durnin et al.

[11] Patent Number: 4,887,885

[45] Date of Patent: Dec. 19, 1989

[54] DIFFRACTION FREE ARRANGEMENT

[75] Inventors: James E. Durnin; Joseph H. Eberly, both of Rochester, N.Y.

[73] Assignee: University of Rochester, Rochester, N.Y.

[21] Appl. No.: 81,394

[22] Filed: Aug. 4, 1987

Related U.S. Application Data

[63] Continuation-in-part of Ser. No. 915,187, Oct. 3, 1986.

[51] Int. Cl.[4] .......................... G21K 1/06; H01S 3/08

[52] U.S. Cl. .......................... 350/162.11; 250/493.1; 350/448; 372/66; 372/103

[58] Field of Search ................ 350/163, 162.11, 162.2, 350/448; 250/493.1; 356/363, 400, 401; 372/103, 66

[56] References Cited

U.S. PATENT DOCUMENTS 4,050,036 9/1977 Chambers et al. .................... 372/66
4,185,254 2/1980 Hall et al. ...................... 331/94.5 D

OTHER PUBLICATIONS

J. M. Stone, Radiation and Optics, published 1963—McGraw-Hill (New York) see p. 132 and FIGS. 7-16.

Goodman, J. W., *Introduction to Fourier Optics*, McGraw-Hill, N.Y., 1968, pp. 14-16.

*Primary Examiner*—Bruce Y. Arnold
*Attorney, Agent, or Firm*—Scully, Scott, Murphy & Presser

[57] ABSTRACT

Arrangements are disclosed for generating a well defined traveling wave beam substantially unaffected by diffractive spreading. In different embodiments, the beam can be an electromagnetic wave, particle beam, a transverse beam, a longitudinal beam such as an acoustic beam, or any type of beam to which the Helmholtz generalized wave equation is applicable. Pursuant to the teachings herein, a beam is generated having a transverse dependence of a Bessel function, and a longitudinal dependence which is entirely in phaser form, which results in a beam having a substantial depth of field which is substantially unaffected by diffractive spreading. In first and second disclosed embodiments respectively, optical and acoustical beams are generated by placing a circular annular source of the beam in the focal plane of a focussing means, which results in the generation of a well defined beam thereby because the far field intensity pattern of an object is the Fourier transform thereof, and the Fourier transform of a Bessel function is a circular function. In a third disclosed embodiment, a microwave beam is generated by transmitting a coherent microwave beam sequentially through a phase modulator, having a periodic stop function pattern, and a spatial filter, whose transmittance is the modulus of the Bessel function, to generate a microwave beam having a transverse Bessel function profile.

More specifically, several embodiments are disclosed of an integrated optical laser cavity and an integrated microwave maser cavity for increasing the efficiency of production of the laser or maser beam. The integrated laser and maser cavities are designed to generate directly from their own gain medium a Bessel-mode diffraction-free beam.

16 Claims, 15 Drawing Sheets

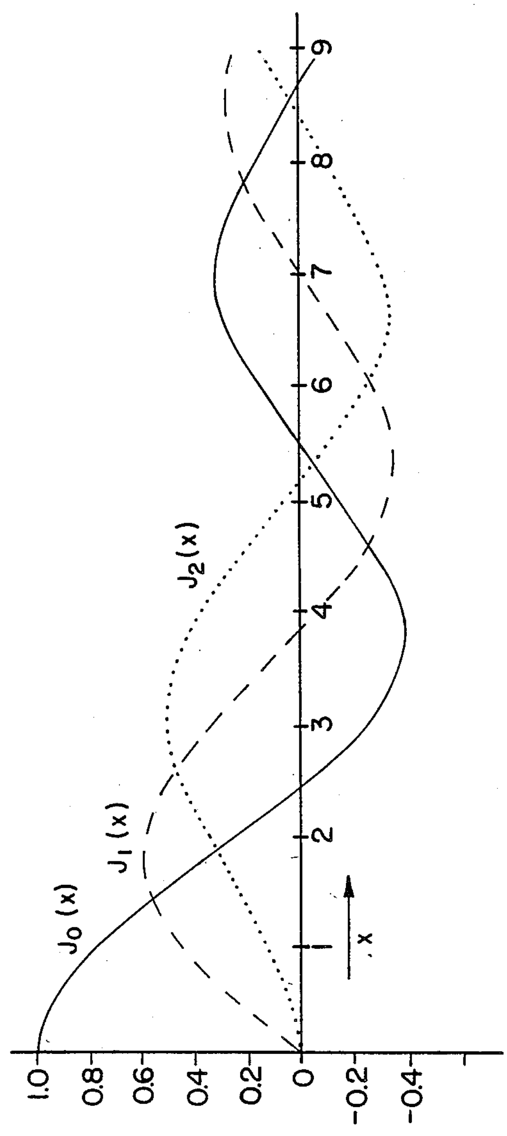
FIG.17 THE BESSEL FUNCTIONS $J_0(x)$, $J_1(x)$, AND $J_2(x)$

DIFFRACTION FREE ARRANGEMENT

This patent application is a continuation-in-part application of Ser. No. 915,187, filed Oct. 3, 1986 for DIFFRACTION FREE ARRANGEMENT, which is hereby expressly incorporated by reference herein.

BACKGROUND OF THE INVENTION

1. Field of the Invention

The present invention relates generally to novel arrangements, including both systems and methods, for generating narrow beams of traveling wave fields in space, and more particularly pertains to several embodiments for integrated radiation cavities (either LASER or MASER cavities) designed to generate in their own medium a Bessel mode diffraction free beam.

Much of the disclosure herein is applicable to all types of waves as described by the basic Helmholtz wave equation, including electromagnetic waves such as radio frequency, microwave, infra-red, optical and x-ray waves, relativistic and nonrelativistic quantum waves associated with particle waves, such as electron, neutron, proton, atom and other quantum particle waves, and further including physical elastic waves such as material deformation waves and longitudinal waves including acoustical waves.

2. Discussion of the Prior Art

Current state of the art techniques to concentrate a wave or form a parallel beam are generally successful only over a very limited range of beam propagation. This range is conventionally related inversely to the degree of concentration. This inverse relationship arises primarily because all wave fields are subject to diffraction (i.e., beam spreading).

The arrangements of the subject invention have several advantages over all prior art techniques currently in use, with a principle advantage thereof being greatly improved resistance to diffraction.

Two methods exist in the current state of the art for generating narrow beams, focusing and collimation. Due to the ever present effects of diffraction, a focus is never perfect. Instead, a focus is characterized as a finite region over which a beam has a minimum radius. The distance along the lens axis, on one side or the other of the focus, where the beam exhibits significant convergence is called the depth of field of the focus. The depth of field of a focus is generally limited by the sharpness of the focus. That is, a very small focal spot can be achieved only at the expense of depth of field.

All light waves, such as those radiated by the sun, lamps and lasers, can be collimated as well as focused. Collimated (parallel) beams are generally preferred because they have much greater depth of field than focused beams, although they are less bright. Collimation is normally accomplished by a series of aligned apertures, which are basically just holes in opaque screens, which allow the light through along just one direction. A sequence of aligned holes along a collimation axis of a beam provides the normal manner of creating a well-defined parallel or collimated beam.

Unfortunately, diffraction affects collimation adversely just as it does focusing. The effects of diffraction on collimation can be described with the explanation that a wave field bends outwardly from the edges of a hole as it proceeds therethrough, and thus the resulting beam is not as well collimated. FIG. 1 illustrates the characteristic behavior of waves traveling through holes. The diffractive bending of water waves that are entering a narrow harbor or passing by a jetty can be shown easily in aerial photographs thereof because of the large scales involved, but the bending of light waves is very difficult to notice under ordinary circumstances because the angle of bending is so small. The bending angle is approximately equal to the ratio of the wavelength of the light to the size of the hole, an angle that is usually less than $10^{-3}$ (one one-thousandth) of a degree. A standard criterion called the "Rayleigh range" identifies the distance over which a collimated beam remains well defined after passing through a hole with a given cross sectional area. The Rayleigh range is the ratio of the area of the hole to the wavelength of the light. The Rayleigh range (here denoted Z) is mathematically characterized by the formula $Z=A/\lambda$, where A denotes the hole's area and $\lambda$ denotes the light's wavelength. For visible light $\lambda$ is very small, in the range 15–30 millionths of an inch. A circular hole with a radius equal to one inch has a Rayleigh range of about $Z=2$ miles. For this reason the diffraction illustrated in FIG. 1 will ordinarily be simply undetectable.

However, if an attempt is made to define the beam extremely well (to be able to illuminate a very small spot quite precisely) then the situation is very different. A spot radius of 50 microns (about two-thousandths of an inch) or smaller is conceivable in applications of modern optical technology. The Rayleigh range for a beam formed by passage through a 50 micron sized hole is only one inch or less. This is much greater than the depth of field of a normal sized lens focal spot, but is still very small on a practical working scale.

These estimates indicate that current techniques for creating narrow collimated beams are simply unable to generate beams that have any significant range at all, particularly with respect to commercial operations such as drilling, embossing, scribing, testing, and other manufacturing or laboratory activities that might advantageously use very narrow beams.

The present invention appears to have applicability and utilization in the semiconductor industry in areas of high precision instruments for optical surface treatments such as etching and marking operations. In these applications, the ability of ordinary light beams to achieve near-wavelength resolution without concern about depth of field or beam divergence could be applied to high-volume integrated circuit manufacturing operations. Tolerances unknown in wafer processing without electron beam or x-ray techniques could be met with ordinary light, perhaps to great advantage in reducing capital costs, magnetic field sensitivity, and worker protection requirements, while increasing instrument reconfiguration flexibility and reducing deadtime between job-runs.

Additionally, in the area of high precision process diagnostics, a major change is evolving in process-flow diagnostic instruments. A new generation of instruments uses laser probes to tag (by excitation of fluorescence, for example) molecules participating in a flowing or mixing process at very precisely located highly sensitive regions of the process. The input probe and the signal received back from the light-sensitized molecule are optical and do not disturb the flow or mix in any way. This is in contrast to all of the previous methods that use mechanical sensors inserted into the process, or macroscopic markers or floats injected to accompany the process. These prior art approaches have the disadvantage that their presence necessarily disturbs the environment being measured. The purpose of localized observations is to provide early warnings of turbulent flow, to monitor the degree of completion of a reaction, etc. The present invention has the advantage of allowing highly precise positioning of its beam center and immunity against beam divergence over relatively great depth of field, compared with all other prior art laser devices.

SUMMARY OF THE INVENTION

The present invention overcomes the prior art limitations on the range of extremely well defined beams, with the term beam herein being utilized generally to refer to the central bright spot, not the full intensity pattern, and is based on the premise that wave fields are subjects to the laws of diffraction. The subject invention can be explained as an arrangement for causing diffractive influences on a beam to cancel each other, thereby allowing the preparation of narrow beams with extreme range or depth of field.

To be specific, reconsider the last example hereinabove of a 50 micron beam. If a diffraction free aperture as described herein, with a radius of one inch, instead of 50 microns, is used to create a 50 micron size beam, the Rayleigh range becomes 500 times greater, about 33 feet. If narrow beams are important for truly distant wave transport, as in reconnaissance and laser rangefinding, a somewhat larger diffraction free aperture would suffice. For example, if a diffraction free aperture with a one-foot radius is used to create a one-inch wide beam, the Rayleigh range grows to 30 miles.

Accordingly, a principal object of the present invention is to provide an arrangement for transforming travelling wave fields into well-defined beams that are not affected by diffractive spreading. The arrangement depends upon a properly designed aperture, and can be applied to any wave field whose wave amplitude Ψ satisfied these mathematical relations:

$$\Psi(x,y,z,t) = \Psi(x,y,z)e^{i\omega t}$$

$$[\nabla^2 + (\omega/v)^2]\,\Psi(x,y,z,t) = 0$$

The letter v designates the velocity of the wave incident on the transmission plate.

It is well known that an extremely wide variety of wave fields satisfy these conditions, including radio, microwave, infra-red, optical, x-ray, and all other electromagnetic waves, many types of sound, water, and elastic waves, and both relativistic and non-relativistic quantum waves associated with electrons, neutrons, protons, atoms and all other quantum particles.

Considering, for illustration, only light waves, the beams generated pursuant to the teachings herein can find immediate application to laser printing, laser surgery, high precision instruments for optical treatment of surfaces such as laser etching, laser marking, high precision process diagnostic instruments, and other laser applications where depth of field and control of beam definition are more crucial than the irradiance thereof. Ranging and signalling and targeting with well defined, high power coherent electromagnetic and other waves over long distances may also be possible in nonabsorbing media and atmospheres.

Pursuant to the teachings herein, nondiffracting apertures can be constructed by following precise criteria which are based upon mathematical principles of waves. The basic criterion of a nondiffracting aperture is to convert a wavefront of an input plane wave beam, obtained in a standard manner, from a laser beam for example, into a wavefront with a very specific form, so that the height and spacing of the modulations of the output electric field strength of the output beam are related to each other in such a way that the beam travels without any change in the modulations. This means that any very sharp maximum, such as the central beam spot, will maintain its small size and will not spread out. Nondiffracting apertures can be built to satisfy these criteria by using commercially available components such as lenses, screens, wave guides, masks, absorption filters, phase shifters, etc.

The term nondiffracting as used herein is meant to apply to a well defined traveling wave beam not subject to beam spreading in the sense that the intensity pattern of the traveling wave beam in a transverse plane is substantially unaltered by propagation over a range which is substantially larger than the Rayleigh range of a Gaussian beam with equal central spot width. Pursuant to the teachings of the present invention, such a wave beam is formed by generating a traveling wave beam the amplitude of which has its transverse dependence substantially identical to $J_m(\alpha\rho)$, the $m^{th}$ Bessel function of the first kind, wherein $\alpha$ is a geometrical constant and $\rho$ designates the transverse radial coordinate of the wave beam, and further wherein the Bessel function argument is independent of the distance z of propagation, which results in a well defined traveling wave beam not subject to beam spreading.

Pursuant to the teachings of the present invention, a well defined traveling wave beam substantially unaffected by diffractive spreading can be generated from a recognition that certain exact, non-singular solutions exist for the free space Helmholtz wave equation which represent a class of fields that are nondiffracting in the sense that the intensity pattern in a transverse plane is substantially unaltered by propagation in free space. More specifically, the present invention recognizes that the only axially symmetric nondiffracting field other than a plane wave is the zero-order Bessel function of the first kind and this beam can have an effective spatial width as small as several wavelengths.

In accordance with the teachings herein, the present invention provides arrangements, encompassing both systems and methods, for generating a well defined traveling wave beam substantially unaffected by diffractive spreading, comprising generating a beam having a transverse dependence of a Bessel function, and a longitudinal dependence which is entirely in phaser form, which results in a beam having a substantial depth of field which is substantially unaffected by diffractive spreading. In one disclosed embodiment, the beam is generated by placing a circular annular source of the beam in the focal plane of a focusing means, which results in the generation of a well defined beam thereby because the far field intensity pattern of an object is the Fourier transform thereof, and the two-dimensional Fourier transform of a Bessel function is a circular function. In a second disclosed embodiment, the beam is generated by transmitting a coherent beam sequentially through a phase modulator, having a periodic step function pattern, and a spatial filter, whose transmittance is the modulus of the Bessel function, to generate a beam having a transverse Bessel function profile.

In different embodiments, the beam can be an electromagnetic wave, a particle beam, a transverse beam, a longitudinal beam such as an acoustic beam, or any type of beam to which the Helmholtz generalized wave equation is applicable.

Moreover, the beam can be generated with a transverse dependence of a zero order Bessel function, or a higher order Bessel function, or any combination of different Bessel functions such as a zero order Bessel function and one or more higher order Bessel functions, as illustrated in FIG. 17.

The present invention offers a significant advantage over prior art methods by permitting a bright central core of a beam to remain concentrated and available for use over much greater ranges of propagation than is currently possible with prior art methods of beam formation. The subject invention is generally applicable to processes that are activated by bright spots (of light, for example), but for which the distance at which the activity occurs is not easily controlled extremely well. These processes can vary from normal manufacturing and laboratory processes such as drilling, embossing, scribing, welding or testing, where the distance is in the few-inch range and beam spot sizes may be extremely small (10–100 microns), to open field processes such as ranging and aligning where the distances and beam spot sizes may both be many thousands of times greater, but relative tolerances about the same.

Pursuant to the teachings of the present continuation-in-part application, several embodiments are described and disclosed of an integrated radiation cavity, as incorporated in a laser or maser, for increasing the efficiency of production of the radiation beams. More particularly, designs are disclosed for integrated optical or microwave cavities for lasers or masers which will generate directly from their own gain medium a Bessel-mode diffraction-free beam.

The different disclosed embodiments for such integrated optical or microwave cavities have several common characteristics: (a) a close relation to a known stable laser or maser cavity design, (b) a large mode volume to permit exploiting the relatively high gain of the laser or maser systems, and (3) little departure in principle from the design that has already led to successful observation of non-diffracting beams.

The several disclosed embodiments of FIGS. 12–16 are generally generic to either Light Amplification by Stimulated Emission of Radiation (LASER's) or Microwave Amplification by Stimulated Emission of Radiation (MASER's). Several of these embodiments are diffraction-free mode generators, and have the common characteristic of integrating the radiation source into the diffraction-free mode generator, as opposed to directing an externally generated beam through a diffraction-free aperture. One embodiment is somewhat of a hybrid specy in this regard as a diffraction-free aperture is incorporated into one end of the resonant cavity.

All of these embodiments are generally expected to produce much higher output power and increased efficiency of operation. Moreover they can be used to produce intense high beams of very small diameter (60 microns or much smaller) having applications, for example, to precision pointing, micro-welding, and ultra-small scale data deposition and scanning.

BRIEF DESCRIPTION OF THE DRAWINGS

The foregoing objects and advantages of the present invention for a diffraction free arrangement may be more readily understood by one skilled in the art with reference being had to the following detailed description of several preferred embodiments thereof, taken in conjunction with the accompanying drawings wherein like elements are designated by identical reference numerals throughout the several views, and in which:

In FIGS. **4*a* through 4*f*, the solid line represents the intensity distribution for a $J_o$ beam and the dotted line represents that of a Gaussian beam, in FIG. 4*a* when $z=0$ (i.e., in the initial plane where the beams are formed), in FIG. 4*b* after propagating a distance $z=25$ cm., in FIG. 4*c* after propagating a distance $z=50$ cm., and in FIG. 4*d* after propagating a distance $z=80$ cm., with $\lambda=0.5$ $\mu$m..

FIG. 5 illustrates the intensity $I(\rho=0,z)$ at the beam center as a function of distance.

in FIG. 13 the focusing element is positioned at one end of the resonant cavity and has a partially reflecting surface thereon forming one end of the resonant cavity; in FIG. 14, the focusing element is placed within the resonant cavity; and in FIG. 15 the focusing element is positioned externally to the resonant cavity;

FIG. 17 illustrates graphs of known Bessel functions $J_0(X)$, $J_1(X)$, and $J_2(X)$.

DETAILED DESCRIPTION OF THE DRAWINGS

Figure 1:
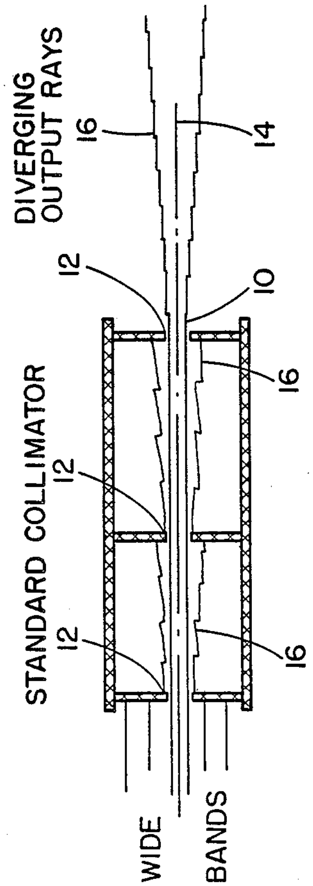
FIG. 1 is a schematic view of an exemplary prior art collimator, and illustrator the effects of diffraction therein.

Referring to the drawings in detail, FIG. 1 is a schematic view of a typical prior art collimator, illustrating a substantially collimated beam 10 after it has passed through three successive apertures 12 positioned in alignment along a collimation axis 14. Specifically, FIG. 1 illustrates an exaggerated view of the effects of diffraction on the beam at 16 after the beam passes through each aperture.

Figure 2:
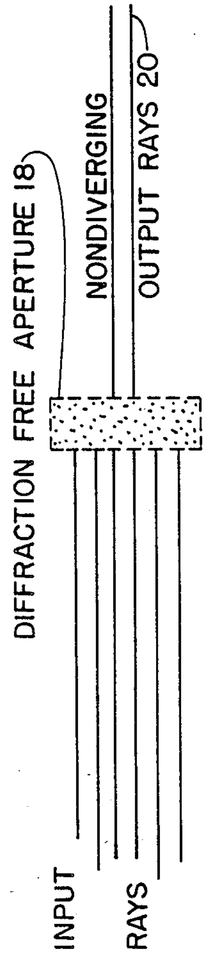
FIG. 2 illustrates a schematic view of nondiverging output beam produced by embodiments of diffraction free apertures constructed pursuant to the teachings of the present invention.

In contrast to FIG. 1, FIG. 2 is a schematic illustration of a diffraction free aperture 18 constructed pursuant to the teachings herein, and illustrates the nondiverging output beam 20 produced thereby.

Pursuant to the teachings of the present invention, a well defined traveling wave beam 20 substantially unaffected by diffractive spreading can be generated from a recognition that certain exact, non-singular solutions exist for the free space Helmholtz wave equation which represent a class of fields that are nondiffracting in the sense that the intensity pattern in a transverse plane is substantially unaltered by propagation in free space. More specifically, the only axially symmetric non-diffracting field other than a plane wave is the zero-order Bessel function of the first kind, and this beam can have an effective spatial width as small as several wavelengths. Several arrangements are disclosed herein for approximately generating $J_o$ beams, and a numerical simulation of their propagation is presented which demonstrates that they possess a remarkable depth of field.

It is characteristic of the familiar wave equations of theoretical physics that they reduce to the Helmholtz equation $$[\nabla^2+\kappa^2]\Psi(\vec{r})=0, \quad (1)$$

when the time-dependence is separable. This is true, for example, of the Klein-Gordon equation, the Schrodinger equation, and various classical equations for light, sound, water, and other types of waves.

A recognized feature of all previously known solutions to equation (1) is that whenever the field $\Psi$ is initially confined to a finite area of radius r in a transverse plane, it will be subject to diffractive spreading after propagating a distance $z>\kappa r^2$ normal to that plane in free space. For this reason, it is commonly thought that any beam-like field (i.e., one whose intensity is maximal along the axis of propagation and tends to zero with increasing transverse coordinate) must eventually undergo diffractive spreading as it propagates. This is certainly true, for example, of Gaussian beams—Gaussian beam having spot size $\theta$, the root mean square width at beam waist, will -diverge at an angle inversely proportional to $\kappa\theta$ at distances $z>\kappa\theta^2$ from the beam waist.

We present here free-space, beam-like, exact solutions of the wave equation (any of the wave equations mentioned above) that are not subject to transverse spreading (diffraction) after the plane aperture where the beam is formed. These solutions are regular and well behaved mathematical functions with finite values at all points and, like plane waves, have finite energy density rather than finite energy. Most importantly, they can have intensity distributions as small as several wavelengths in every transverse plane, independent of propagation distance.

Consider the electromagnetic wave equation as a particular example. In this case $\Psi$ represents the complex amplitude of one component of a monochromatic electric field assumed to be polarized normal to the direction of propagation. One can easily verify that for time dependence $e^{-i\omega t}$ arr exact solution of equation (1) for fields propagating into the source-free region $z\geqq 0$ is $$\Psi(x,y,z\geqq 0)=e^{i\beta z}\Psi(x,y,z=0), \quad (2)$$

with the amplitude in the z=0 plane being equal to $$\psi(x,y,z=0) = \int_0^{2\pi} A(\phi)e^{i\alpha[x\cos(\phi)+y\sin(\phi)]}\,d\phi. \quad (3)$$

Here $A(\phi)$ is an arbitrary complex function of $\phi$, and $\beta=[\kappa^2-\alpha^2]^{\frac{1}{2}}$.

The separable z-dependance in equation (2) is the critical property which the present invention recognizes is characteristic of non-diffracting solutions. Note that when $\beta$ is real it gives immediately $|\Psi(x,y,z\geqq 0)|=|\Psi(x,y,z=0)|$. The transverse structure in the z=0 plane is reproduced exactly in every other plane for $z>0$, and this recognition presents some remarkable consequences.

The real time-dependent field associated with the complex amplitude $\Psi$ is $$E(\vec{r},t)=\tfrac{1}{2}\Psi(\vec{r})\, e^{-i\omega t}+\text{c.c.}, \quad (4)$$

where c.c. denotes complex conjugate, $\omega=c\kappa$, and c is the speed of light. The time-averaged intensity of this field is simply $$I(r) = \lim_{T\to\infty}\int_0^T E^2(r,t)\frac{dt}{T} = \frac{1}{2}\,|\psi(r)|^2. \quad (5)$$

For any value of $\alpha$ in the interval $0\leqq\alpha\leqq\kappa$, a field of the form given in equation (2) will be nondiffracting in the sense that the intensity pattern in the z=0 plane is reproduced in every plane normal to the z-axis:

$$I(x,y,z\geqq 0)=I(x,y,z=0). \quad (6)$$

For values of $\alpha>\kappa$, the solutions are evanescent waves whose intensities decrease exponentially along the z axis.

By superimposing monochromatic non-diffractive fields of amplitude $V_m$ and frequency $\omega_m=c[\beta_m^2+\alpha^2]^{\frac{1}{2}}\geqq c\alpha$ one obtains a polychromatic solution of the wave equation $$E(r,t) = \frac{1}{2}\,\psi(x,y,z=0)\sum_m V_m e^{i[\beta_m z-\omega_m t]} + \text{c.c.}, \quad (7)$$

for which the time-averaged intensity is $$I(x,y,z\geqq 0) = \left[\frac{1}{2}\sum_m |V_m|^2\right]|\psi(x,y,z=0)|^2. \quad (8)$$

Thus a field need not be monochromatic in order to be nondiffracting in the sense that we have defined. It is only necessary that all of the frequencies exceed the value $\alpha c$ when $\Psi$ is of the form given in (3).

The only axially symmetric non-diffracting fields are those for which the function $A(\phi)$ is independent of $\phi$, namely, those fields whose amplitudes are proportional to $$\psi(\rho,z=0) = \int_0^{2\pi} e^{i\alpha[x\cos(\phi)+y\sin(\phi)]}\frac{d\phi}{2\pi} = J_o(\alpha\rho). \tag{9}$$

Figure 3:
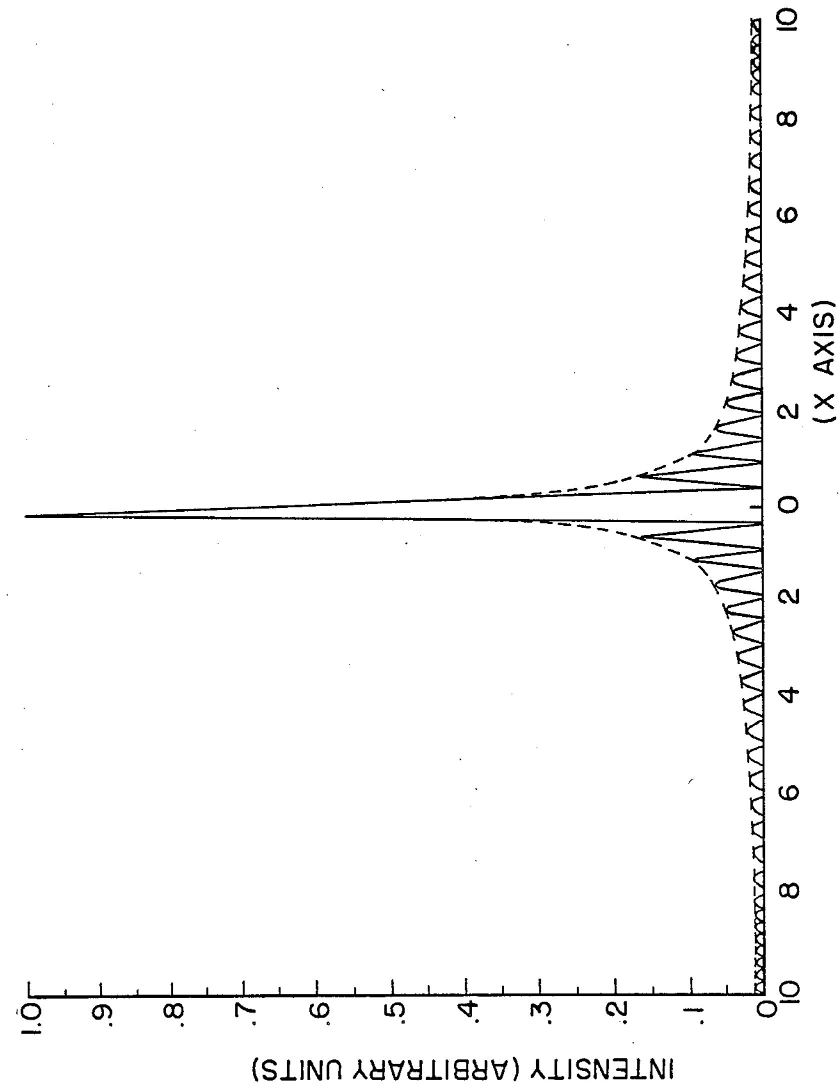
FIG. 3 illustrates a Bessel function intensity distribution wherein the solid line represents $J_o^2(X)$, and the dotted line envelope represents $2\pi x$.

Here $\rho^2=x^2+y^2$ and $J_o$ is the zero-order Bessel function of the first kind. When $\alpha=0$ the solution is simply a plane wave, but for $\alpha>0$ we have an intensity distribution whose envelope is inversely proportional to $\alpha\rho$, as shown in FIG. 3. The effective width of the beam is governed by $\alpha$ and when $\alpha$ equals the maximum possible value $\kappa=2\pi\lambda$ for a non-evanescent field, the central maximum has a diameter of approximately $3\lambda/4$.

It is easily shown that none of the nondiffracting field solutions given by equation (3) are square-integrable, but the equations and solutions are idealizations applying to infinite, empty space, and thus an infinite amount of power would be required to create a spatial mode of that form over an infinite space, and we will now examine the propagation properties of $J_o$ beams of finite aperture.

Figure 4A:
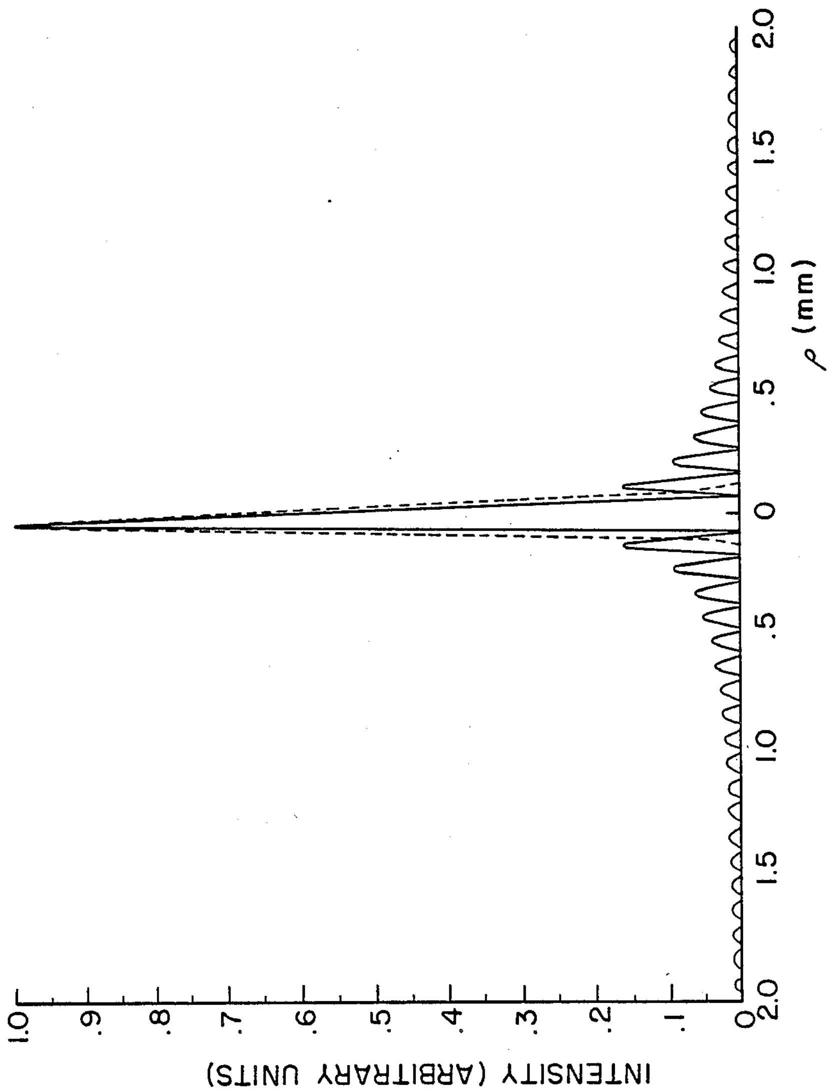
In FIGS. 4*b–d*,** the intensity of the Gaussian beam has been multiplied by 10 to make it visibly discernible.
Figure 4B:
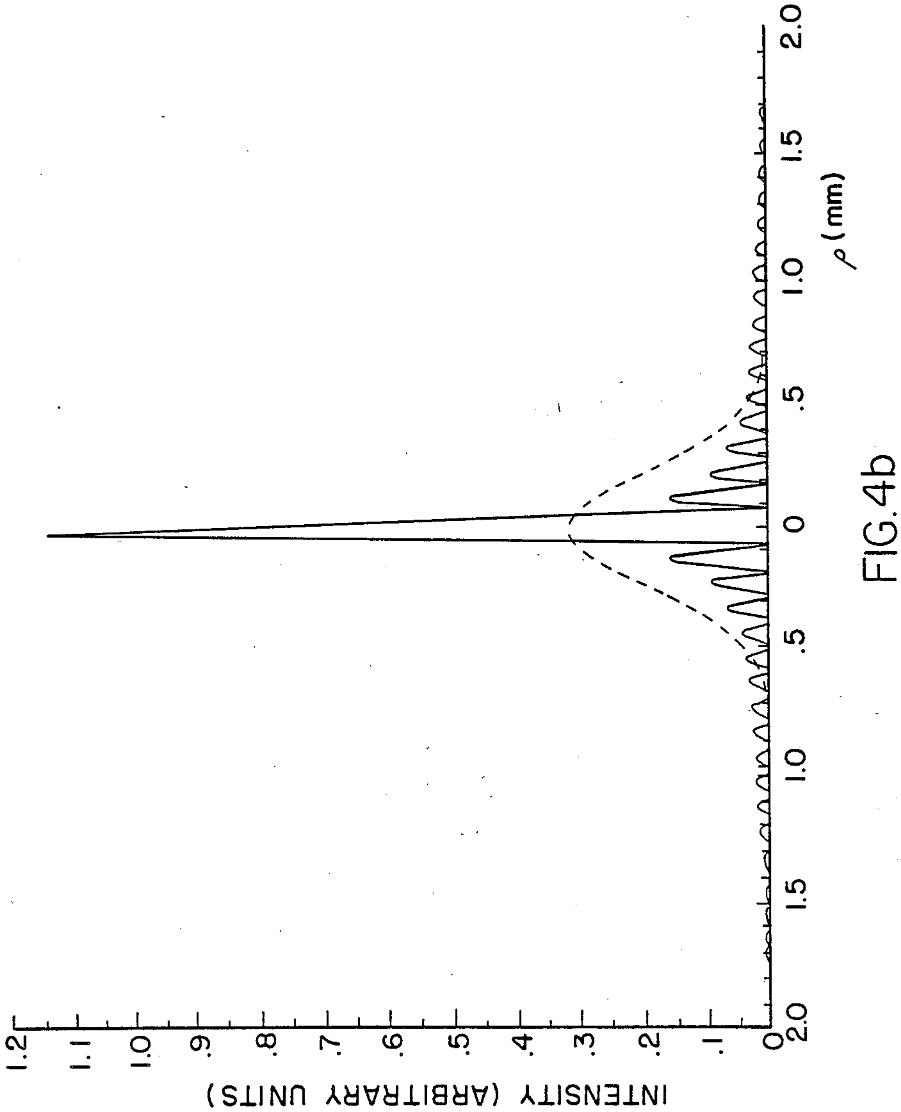
Figure 4C:
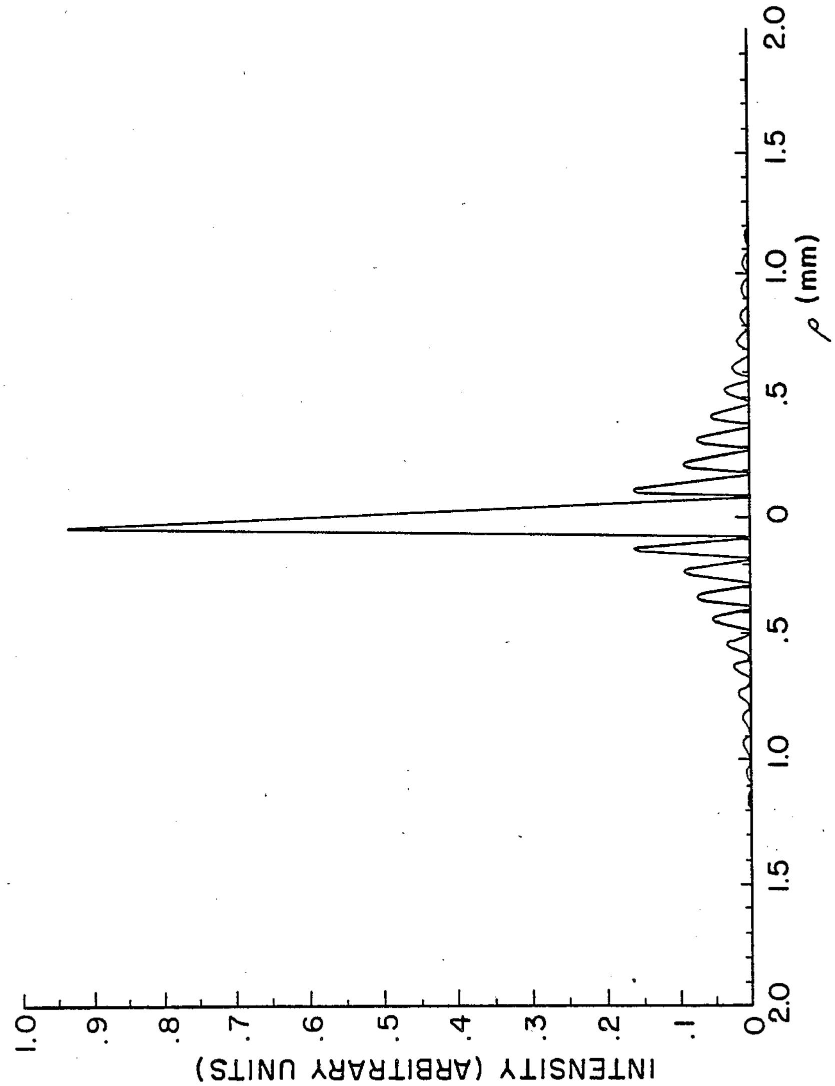
Figure 4D:
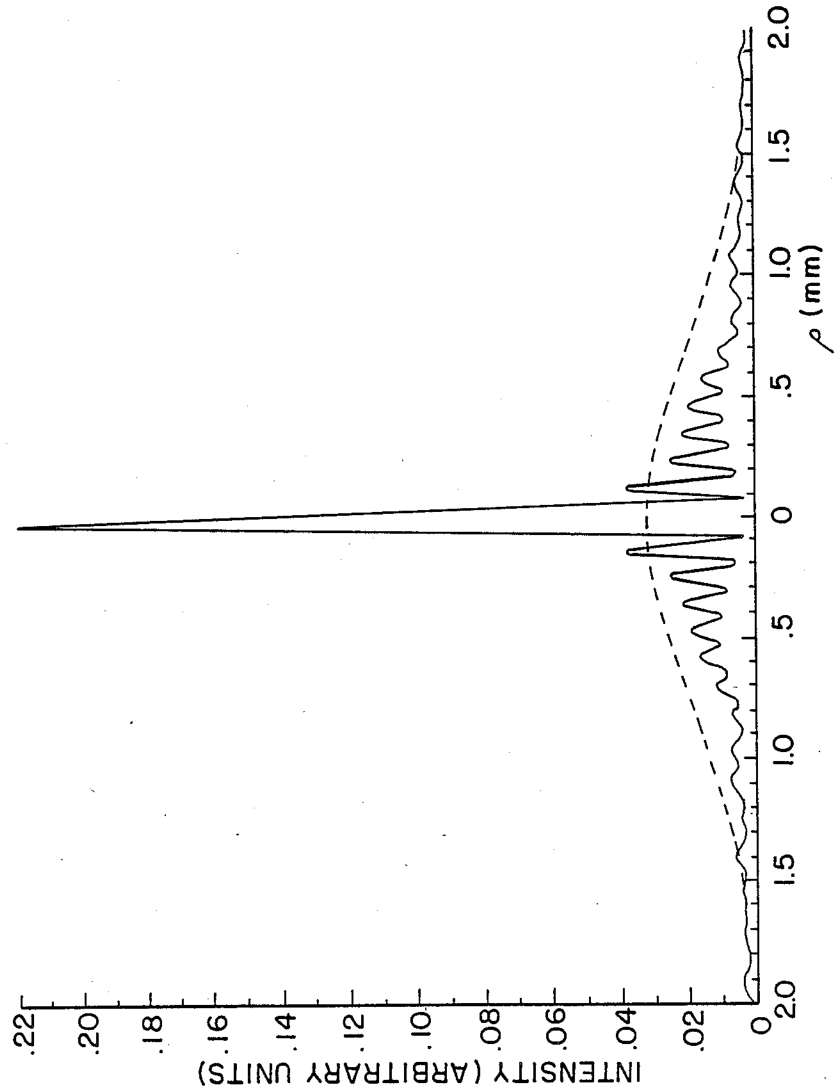

FIGS. 4*a* through 4*f* are graphical comparisons of the performance of an exemplary embodiment of a diffraction free aperture pursuant to the present invention compared with a Gaussian system. In FIGS. 4*a* through 4*f*, the solid line represents the intensity distribution for a $J_o$ beam produced pursuant to the teachings of the present invention, and the dotted line represents that of a Gaussian beam, in FIG. 4*a* when z=0 (i.e., in the initial plane where the beams are formed), in FIG. 4*b* after propagating a distance z=25 cm., in FIG. 4*c* after propagating a distance z=50 cm., and in FIG. 4*d* after propagating a distance z=80 cm., with $\lambda=0.5$ μm.. In FIGS. 4*b*–*d*, the intensity of the Gaussian beam has been multiplied by 10 to make it visibly discernible.

Figure 5:
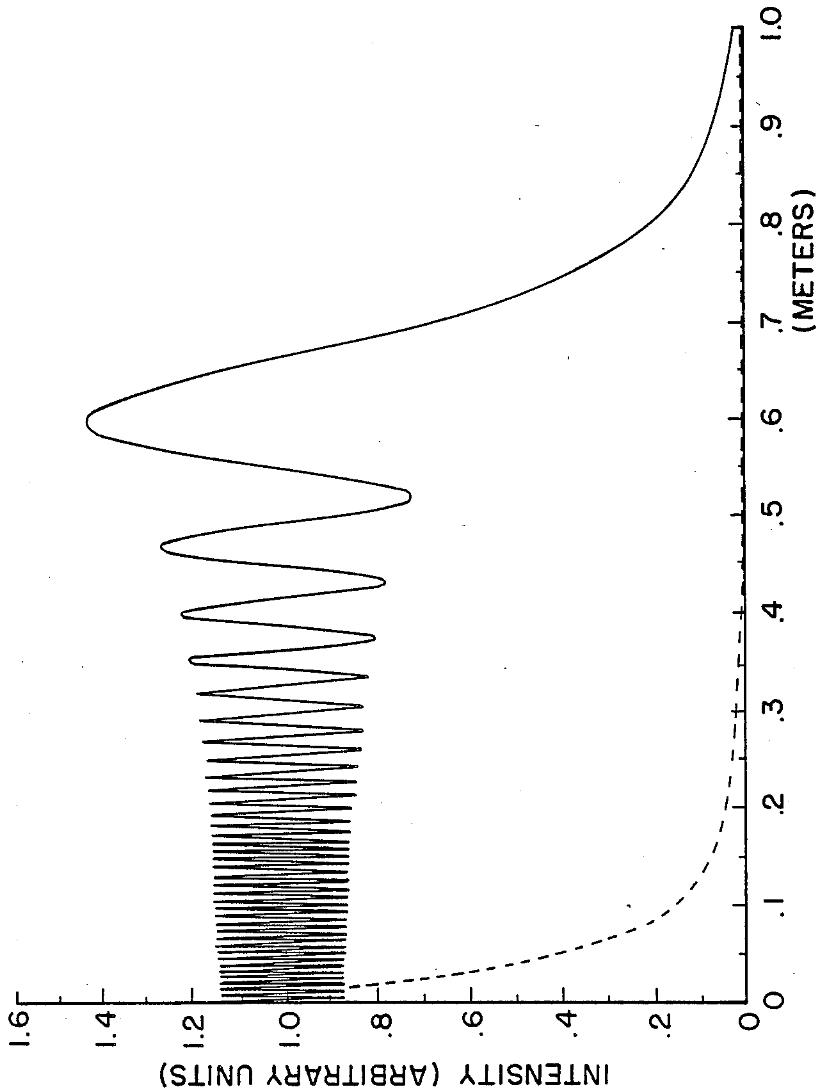
In FIG. 5, the solid and dotted lines again correspond to the $J_o$ and Gaussian beams whose initial intensity distribution at $z=0$ are shown in FIG. **4*a*.

FIG. 5 illustrates the intensity $I(\rho=0,z)$ at the beam center as a function of distance of the $J_o$ and Gaussian beams, whose initial intensity distributions at z=0 are shown in FIG. 4*a*.

The intensity distribution $I(\rho,z=0)=J_o^2(\alpha\rho)$ when $\alpha=\pi\times 10-4$ meters $^{-1}$ is shown in FIG. 4*a*. The central spot diameter is then 0.15 mm, and we assume that the field is zero for all $\rho>2$ mm. FIG. 4*a* also illustrates a dotted line which represents the intensity distribution of a Gaussian beam whose FWHM is 0.12 mm (the integrated energy is approximately 10 times less than that of the $J_o$ beam).

FIG. 5 is a numerical simulation of the propagation of the central peak intensity (i.e., the intensity at $\rho=0$) for each beam as a function of distance from the aperture when the wavelength of each field is $\lambda=0.5$ μm. Since the initial energy in the $J_o$ beam is substantially greater than that of the Gaussian beam, it is not remarkable that the $J_o$ beam propagates a greater distance than the Gaussian. What is remarkable is that even as the peak intensity of the $J_o$ beam oscillates (in a manner remeniscent of the intensity distribution for the diffraction pattern near a straight edge), the central maximum of the intensity profile doesn't spread along the entire range of propagation, as demonstrated in FIGS. 4*b*–*d*. Such a beam would be very useful, for example, in performing high precision autocollimation or alignment.

There is a simple and accurate method for finding the range of a $J_o$ beam of finite aperture. One sees from equation (9) that the $J_o$ beam is a superposition of plane waves, all having the same amplitude and traveling at the same angle $\theta=\sin^{-1}(\alpha/\kappa)$ relative to the z-axis, but having different azimuthal angles ranging from 0 to 2 $\pi$. For such a field, geometrical optics predicts that a conical shadow zone begins at the distance $$z=r/\tan\theta=r[(\kappa/\alpha)^2-1]^{\frac{1}{2}}, \tag{10}$$

where r is the radius of the aperture in which the $J_o$ beam is formed. For the case shown in FIG. 4*a* one finds that $\theta=0.143^o$ and z=80 cm, which is a point located right at the base of the sharp decline in beam intensity shown in FIG. 5. In fact, equation (10) has been found to accurately predict the effective range of $J_o$ beams of finite aperture for values of $\alpha$ in the range $\alpha=\kappa$ (when there is no propagation) to $\alpha=2\pi/r$ (when the source field is essentially just a disc of radius r).

One method of creating a $J_o$ beams of finite aperture is by plane wave illumination of an object whose amplitude transmission function is equal to $J_o(\alpha\rho)$. This object would consist of a phase plate whose amplitude is +1 in those regions that $J_o(\alpha\rho)>0$ and −1 in those regions where $J_o(\alpha\rho)>0$, followed by a mask (e.g., photographic film) whose amplitude transmission if equal to $|J_o(\alpha\rho)|$. Another simple method consists of uniformly illuminating a circular slit located in the focal plane of a lens. In principle, each point on the circular slit acts as a point source which produces a plane wave propagating at an angle $\theta=\tan^{-1}(\epsilon/f)$, where $\theta$ is the radius of the slit and F is the focal length of the lens. If the incident light is of wavelength $\lambda$, the resulting $J_o$ beam will have a central spot diameter of $(3\lambda/4)[1+(f/\epsilon)^2]^{\frac{1}{2}}$.

Figure 6:
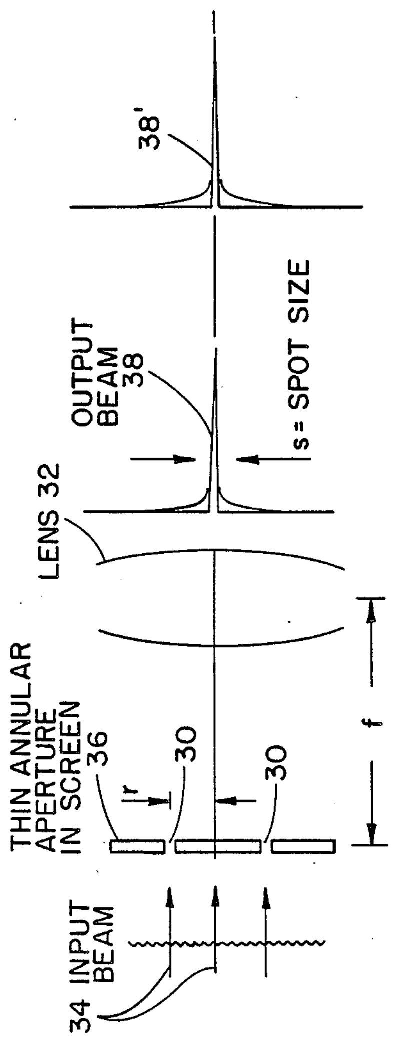
FIG. 6** illustrates a first embodiment of the present invention which is particularly applicable to optical waves, microwaves and acoustical waves.

The embodiment of FIG. 6 generates a beam having a transverse dependence of a Bessel function by placing a circular annular source 30 of an input beam 34 in the focal plane of a lens focusing means 32, which results in the generation of a well defined beam thereby because the far field intensity pattern of an object is the Fourier transform thereof, and the Fourier transform of a Bessel function is a circular function. The arrangement of FIG. 6 forms the narrow beam 38 as predicted by the theory herein, which substantially retains its form at 38' unaffected by the normal spreading effects of diffraction.

The arrangement of FIG. 6 is generally applicable to embodiments with optical components, microwave components and acoustical components because of the commercial availability of the different components of the arrangement of FIG. 6 for those types of beams.

It has been shown, with reference to FIG. 6, that the sharp central spot size s is related to the radius r of the circular hole in the screen, the focal length f of the lens, and the wavelength $\lambda$ of the light beam by the simple formular $s=(\frac{3}{4})(\lambda f/r)$.

Figure 7:
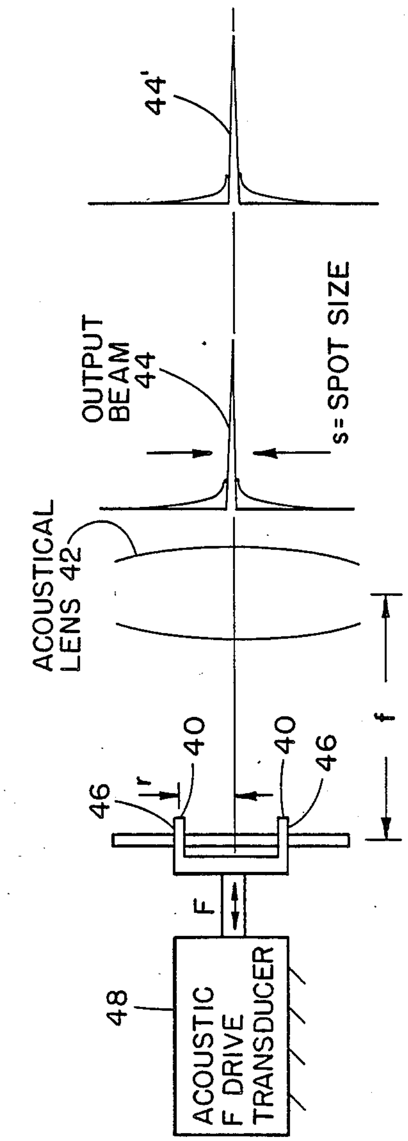
FIG. 7 is a schematic illustration of a second embodiment of the subject invention, analagous to the first embodiment of FIG. 6 but designed specifically for operation with acoustical waves.

FIG. 7 is a schematic illustration of a second embodiment of the subject invention, analogous to the first embodiment of FIG. 6 but designed specifically for operation with acoustical waves. In this embodiment, a circular annular source 40 of an acoustical beam is placed in the focal plane of an acoustic lens 42 to produce a narrow acoustical beam 44 as predicated by the theory herein which substantially retains its form at 44' unaffected by normal spreading effects of diffraction.

The annular source 40 can be formed by a circular annular diaphragm 46 reciprocally driven at a selected acoustical frequency F by an acoustic drive transducer 48.

The acoustical lens 42 can take any common form such as those described in *SOUND WAVES AND LIGHT WAVES*, by Winston E. Kock. This reference also describes several different types of microwave lens which could operate in microwave embodiments analogous to the embodiments of FIGS. 6 and 7. The annular source of a microwave embodiment could be very similar to that illustrated in FIG. 6, with the screen 36 now being opaque to microwaves, such as by metal screen.

Figure 8:
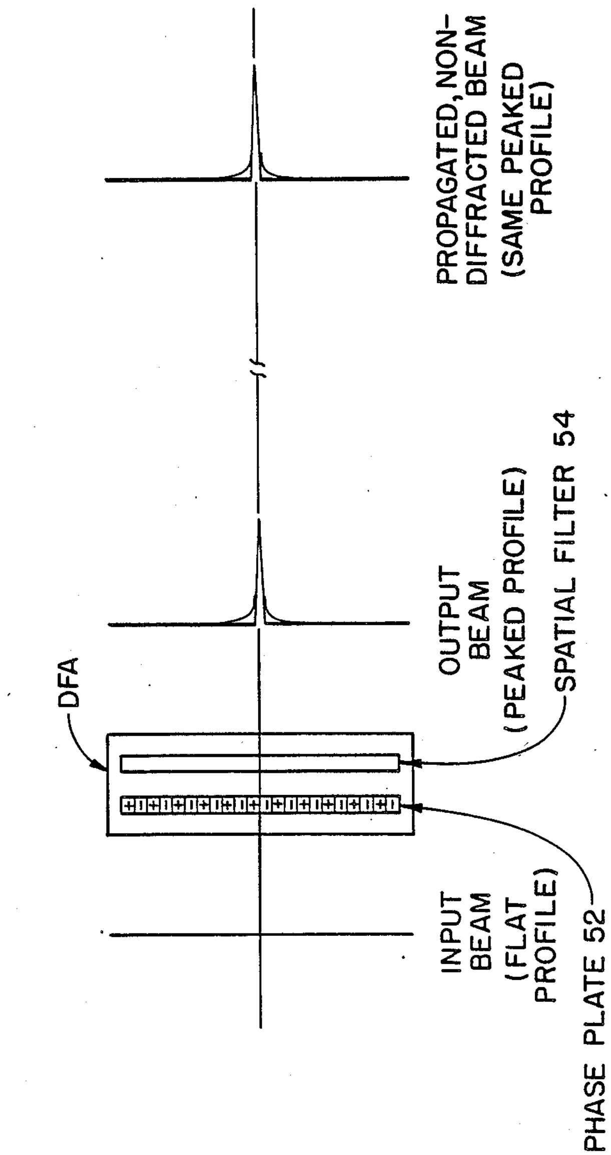
FIG. 8 illustrates a third embodiment of the present invention, particularly applicable to operation with microwaves.
Figure 9:
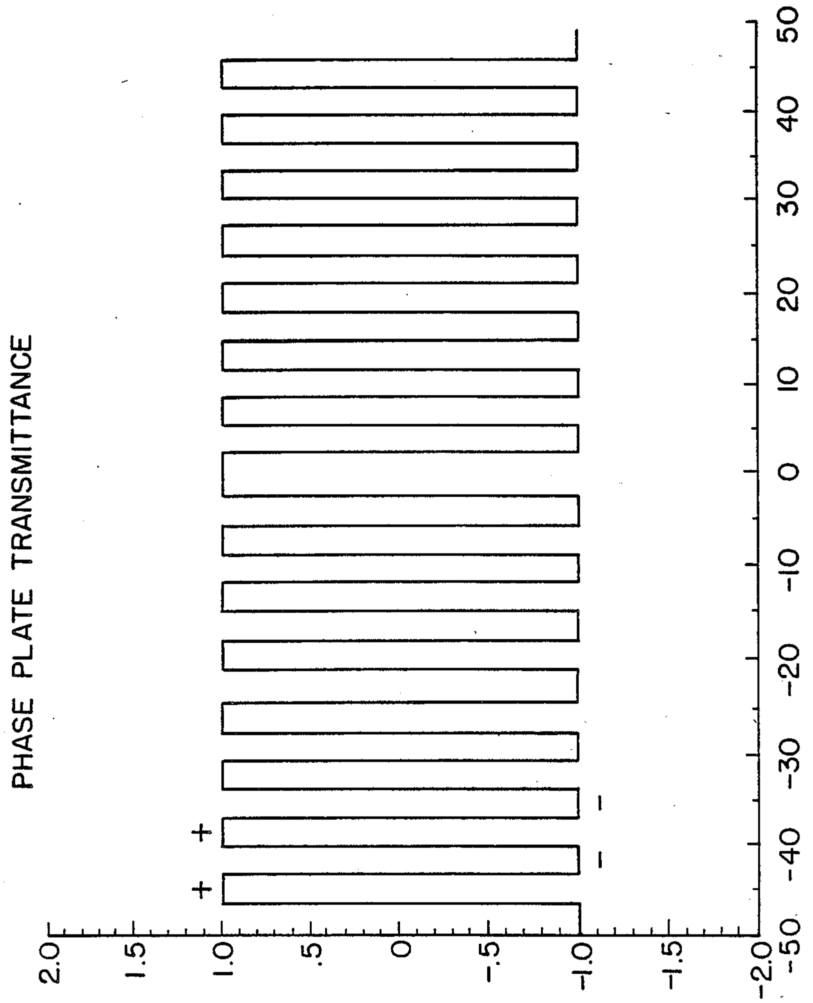
FIGS. 9, 10 and 11 illustrate respectively the phase plate transmittance, the spatial filter transmittance, and the output beam intensity of the third embodiment of FIG. 8.
Figure 10:
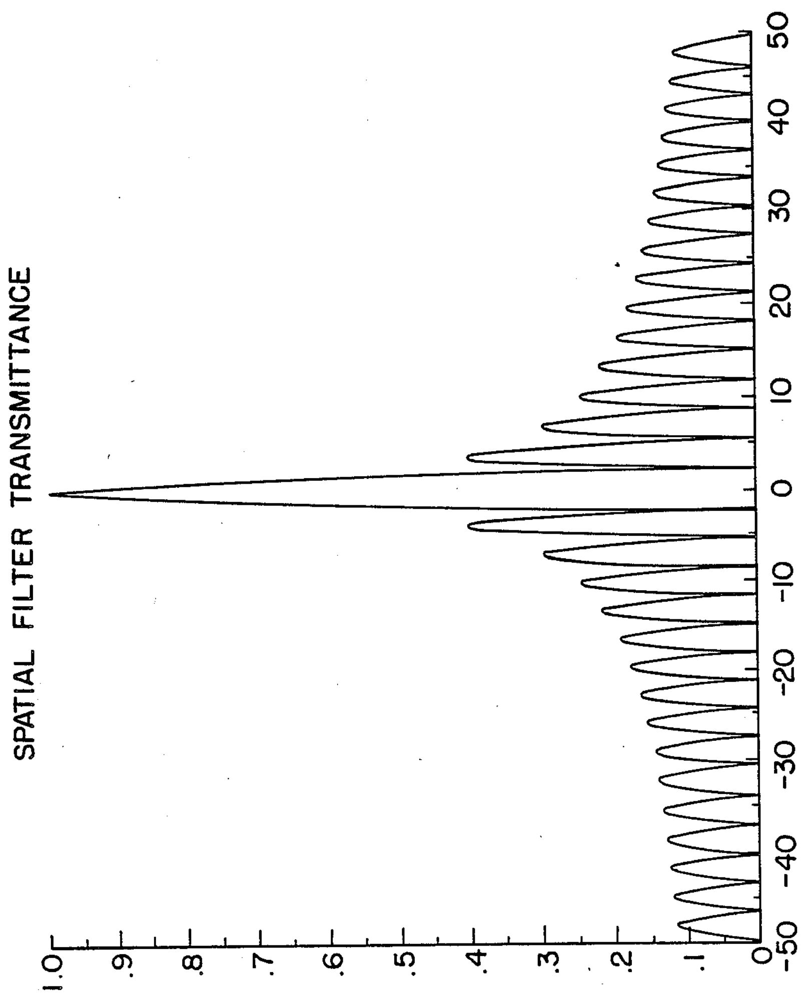
Figure 11:
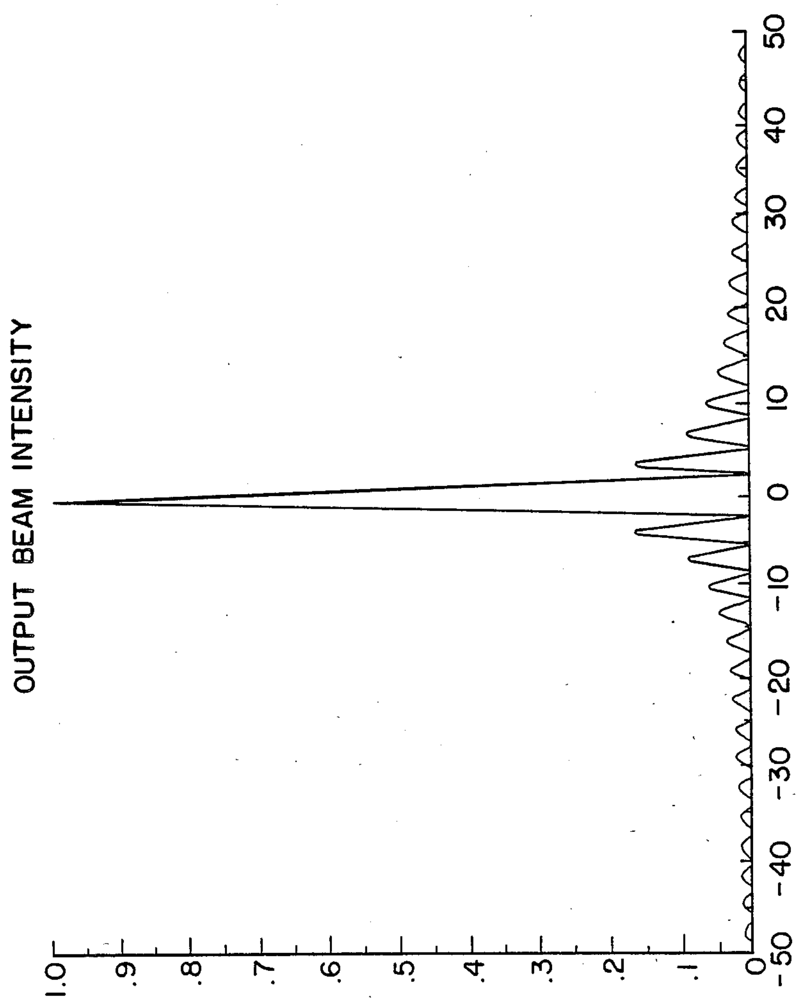

FIG. 8 illustrates a third embodiment of the present invention, particularly applicable to operation with microwaves, and FIGS. 9, 10 and 11 illustrate respectively the phase plate transmittance, the spatial filter transmittance, and the output beam intensity of the third embodiment of FIG. 8.

In microwave embodiments, the wavelength is not microscopic, but typically may be several centimeters (one inch=2.54 cm). This size allows an array of a large number of phase shifters in a phase plate 52 to be coupled with an absorption filter 54, an shown schematically is FIG. 8. The absorption filter 54 is selected of elements whose degree of absorption is tailored to produce the overall size of the required Bessel modulation, while the phase shifters generate the negative portions of $J_o(\alpha\rho)$.

In this embodiment, the beam is generated by transmitting a coherent beam sequentially through a phase modulator, having a periodic step function pattern, and a spatial filter, whose transmittance is the modulus of the Bessel function, to generate a beam having a transverse Bessel function profile.

As illustrated in FIG. 9, the phase plate 52 can have a periodic step pattern which alternately transmits and blocks microwaves which is aligned with the spatial filter 54 having a microwave transmittance function as illustrated in FIG. 10. In a practical embodiment, the spatial filter 54 could be constructed by using a recording densitometer to record the function of FIG. 10.

A prototype diffraction free aperture has been constructed tested with commercially available optical equipment arranged as illustrated in FIG. 6, and its operation is substantially in agreement with the mathematical conclusions drawn from the Wave Equation and expressed herein.

The following detailed discussion of the five related embodiments of FIGS. 12–16 is generally generic to either Light Amplification by Stimulated Emission of Radiation (LASER's) or Microwave Amplification by Stimulated Emission of Radiation (MASER's), and the only real difference therebetween is in the selection of different components for focusing of the radiation, or different materials for reflecting or partially reflecting the particular wavelengths of radiation involved therein.

The embodiments of FIGS. 12–15 are all diffraction-free mode generators, and have the common characteristic of integrating the radiation source into the diffraction-free mode generator, as opposed to directing an externally generated beam through a diffraction-free aperture. The embodiment of FIG. 16 is somewhat of a hybrid specy in this regard as a diffraction-free aperture is incorporated into one end of the resonant cavity.

All of the embodiments of FIGS. 12–16 are generally expected to produce much higher output power and increased efficiency of operation. Moreover they can be used to produce intense light beams of very small diameter (60 microns or much smaller) having applications to precision pointing, microwelding, and ultra-small scale data deposition and scanning.

The different disclosed embodiments of FIGS. 12–16 have several common characteristics: (a) a close relation to a known stable laser or maser cavity design, (b) a large mode volume to permit exploiting the relatively high gain of laser or maser system, and (c) little departure in principle from the design that has already led to successful observation of non-diffracting beams.

Figure 12:
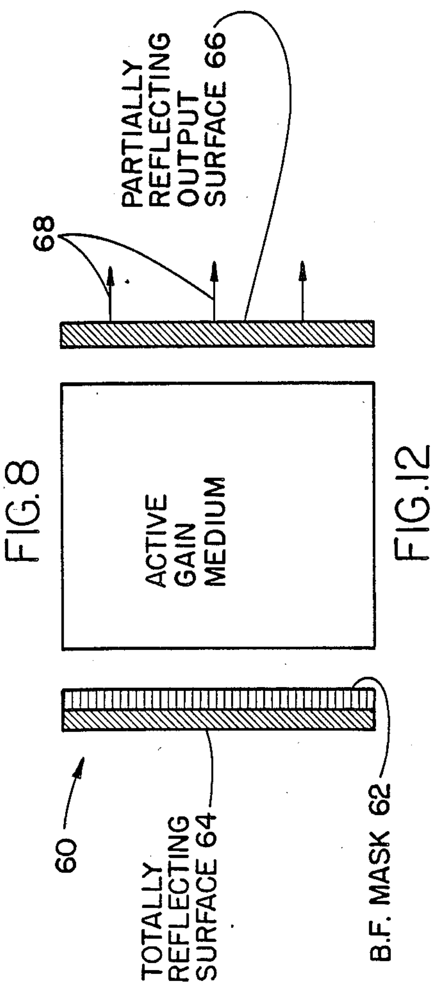
FIG. 12 illustrates a first embodiment of a diffraction-free mode generator having a resonant cavity incorporating therein a synthesized Bessel mask designed to achieve a required Bessel function behavior for the electric field amplitude of the radiation beam.

FIG. 12 illustrates a first embodiment of a diffraction-free mode generator 60 having a resonant cavity with a pumped active gain medium therein. A synthesized Bessel function mask 62 is placed at one end of the resonant cavity, and is designed to achieve a required Bessel function behavior for the electric field amplitude of the radiation beam. The mask 62 is similar in principle to a combination of the phase plate 52 and spatial filter 54 illustrated in the embodiment of FIG. 8, and can be fabricated in any known manner such as holographically. This embodiment is particularly suitable for generating all of the Bessel mode beams with appropriate modifications of the mask. The so-called "higher modes" correspond to Bessel functions of index number higher than zero: $J_1$, $J_2$, etc. By using a collection of higher Bessel modes in conjunction with the zero-order mode, non-diffracting beams can be produced with any desired shape of beam spot-oval instead of circular, for example. The resonant cavity also includes a reflecting mirror surface 64 adjacent to the Bessel Function mask 62 and defining one end of the resonant cavity, with the other end of the resonant cavity being defined by a partially reflecting mirror surface 66. The diffraction-free Bessel mode beam 68 is formed by that portion of the radiation which is transmitted through the partially reflecting mirror surface 66.

Figure 13:
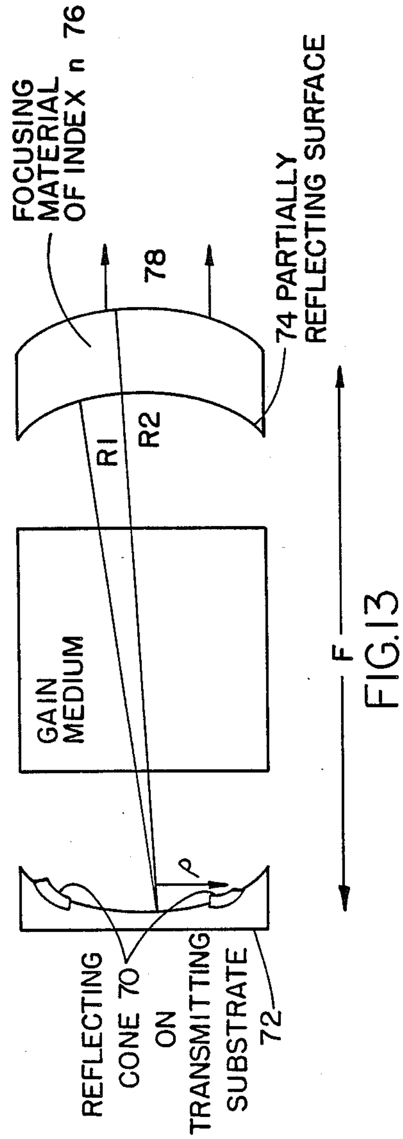
FIGS. 13, 14 and 15 illustrate second, third and fourth embodiments of diffraction-free mode generators for increasing the efficiency of production of the radiation beam in which an annular reflector is incorporated in one end of the resonant cavity and establishes a stable confocal mode distribution therein.
Figure 14:
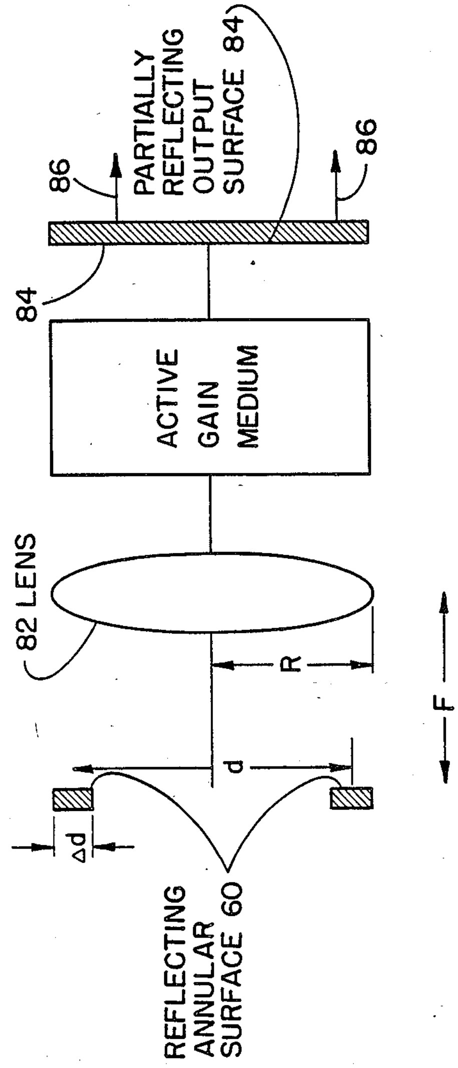
Figure 15:
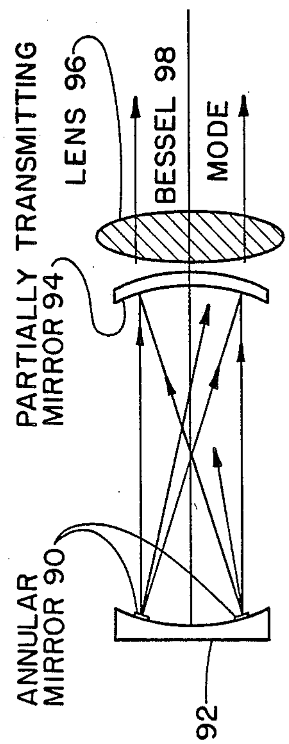
Figure 16:
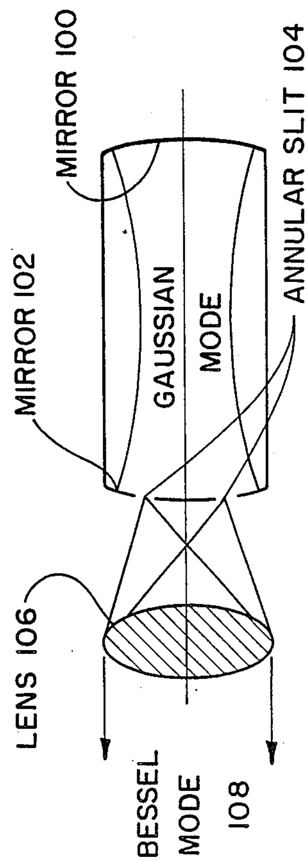
FIG. 16 illustrates a fifth embodiment of an integrated radiation cavity for increasing the efficiency of production of the radiation beam in which the output of the radiation cavity is designed to occur directly in the form of a narrow annular ring which is positioned in the focal plane of a focusing element which projects a Bessel mode non-diffracting beam.

The embodiments of a diffraction-free mode generator illustrated in FIGS. 13, 14 and 15 make use of the "bright circle" Fourier principle underlying the zero-order Bessel mode corresponding to the zero-order Bessel function $J_o$. Each of these embodiments incorporates within the resonant cavity a radiation reflective element in the shape of a narrow circle or annulus, and a lens is positioned to image the circle for transmittal outside of the cavity. In all three embodiments, the output beam draws efficiently on the gain medium, as does a laser or maser, but the optical or microwave components convert the radiation from the normal laser or maser (Gaussian) form to the non-diffracting Bessel mode beam.

In the embodiments of FIGS. 13, 14 and 15, the mean diameter of the annular reflector is $d(=2\rho)$, the width of the annular reflector is $\alpha d$, the radius of the focusing lens system is R, the focal length thereof is f, and the radiation has wavelength $\lambda$. Ideally, each point along the annual reflector acts as a point source which the lens transforms into a plane wave. The set of plane waves formed in this manner has wave vectors lying on the surface of a cone, and it has shown that this can be regarded as the defining characteristic of the $J_o$ beam. The $J_o$ beam produced in this manner has a spot parameter $\alpha=(2\pi/\lambda)\sin\theta$, where $\theta=\tan^{-1}(d/2f)$. In practice, of course, the amplitude is modulated by the diffraction envelope of the annular reflector. That modulation is negligible within the finite output aperture R, provided that $\alpha d<\lambda f/R$.

The embodiment of FIG. 13 places an annular reflector or mirror (in optical embodiments) 70 on a transmitting substrate 72. The second end of the resonant cavity is defined by a partially reflecting reflector or mirror surface 74 on a focusing element 76 having the annular mirror 70 positioned in the focal plane, such that it projects a non-diffracting Bessel mode bean 78.

The embodiment of FIG. 14 simply places an annular reflecting or mirror surface 80 at one end of the resonant cavity. The annular reflector or mirror 80 is placed in the focal plane of a focusing element 82 in the resonant cavity, and the output non-diffracting Bessel mode beam 86 passes through a partially reflecting output surface 84.

The embodiment of FIG. 15 places an annular reflecting mirror (for optical embodiments) surface 90 on a transparent substrate 92 at one end of the laser or maser cavity. The opposite end of the resonant cavity is formed by a partially transmitting mirror (for optical embodiments) surface 94. The transmitted portion of the beam is focused by a focusing element 96 having the annular mirror 90 positioned in its focal plane to form the output non-diffracting Bessel mode beam 98.

The embodiment of FIG. 16 is somewhat of a hybrid embodiment wherein a maser or laser cavity is defined by two end reflectors or mirrors 100 and 102, the latter of which has an annular aperture or slit 104 formed therein. A focusing element 106 is positioned outside of the resonant cavity to have the annular aperture 104 in its focal plane, and projects the output non-diffracting Bessel mode beam 108.

In this embodiment, the width $\alpha d$ of the annular slit should be as narrow as possible to sustain a Gaussian mode of operation in the cavity, and preferably is of the order of one wavelength.

In alternative embodiments, particularly with respect to the designs of FIGS. 13-16, other types of focusing system designs could be utilized, such as reflective-based focusing systems. Moreover, each laser cavity embodiment could be implemented in any type of laser cavity operating in the infra-red, visible or ultraviolet wavelengths of light, such as gas lasers, liquid lasers, solid lasers, laser diodes, and continuous wave or pulsed lasers. Each maser cavity embodiment could operate in any suitable portion of the microwave spectrum.

During Single-Mode Operation of any of the resonant cavities illustrated in FIGS. 12-16, when the losses of the cavity are adjusted so that only a single longitudinal mode is above threshold, the output is a temporally-coherent $J_o$ beam which can be propagated as taught herein substantially unaffected by diffractive spreading.

During Multimode Operation of the resonant cavity illustrated in FIG. 12, each of the longitudinal modes which are lasing or masing (i.e. those modes within the gain profile that are above threshold) will have the same transverse mode structure, namely, that of a $J_o$ beam. Although the output will now be temporarily-incoherent, the time-averaged intensity profile will be exactly the same as that obtained when only a single longitudinal mode was lasing.

When the cavities of FIGS. 13-16 oscillate multimode, each longitudinal mode will be in a transverse $J_o$ mode whose spot size is proportional to the longitudinal mode frequency. The range $\alpha s$ in spot sizes is given by $\alpha s/s=\alpha W_G/W$, where $\alpha W_G$ is the bandwidth of the gain profile and w is the mean frequency of oscillation. In all currently known gain media, this ratio is on the order of $10^{-3}$ or less, and therefore the transverse intensity profile near the center of the beam will essentially the same as that obtained in single-mode operation as frequency w.

Mode-locking (A discussion of the various methods that can be used to effect mode locking can be found, for example, in: A. Yariv, Quantum Electronics, Ch. 11, Wiley, 1975) can be used to transform the temporally-incoherent output of these laser or maser cavities into a train of pulses of width $\alpha t=2\pi/\alpha W_G$ (which ranges from pico to nanoseconds for typical laser media). A further advantage of mode locking is that the peak output power is increased in direct proportion to the number of modes that are lasing or masing.

While several embodiments and variations of the present invention for a diffraction free arrangement are described in detail herein, it should be apparent that the disclosure and teachings of the present invention will suggest may alternative designs to those skilled in the art.

What is claimed is:

1. A system for generating a well defined traveling wave radiation beam not subject to beam spreading in the sense that the intensity pattern of the traveling wave radiation beam in a transverse plane is substantially unaltered by propagation over a range which is substantially larger than the Rayleigh range of a Gaussian beam with equal central spot width, said system generating a traveling wave radiation beam the amplitude of which has its transverse dependence substantially identical to $J_m(\alpha\rho)$, the $m^{th}$ order Bessel function of the first kind, wherein $\alpha$ is a geometrical constant and $\rho$ designates the transverse radial coordinate of the wave, and further wherein the Bessel function argument is independent of the distance z of the propagation, which results in a well defined traveling wave beam not subject to beam spreading, said generating means comprising a pumped resonant cavity for the amplification of radiation for establishing a state of resonant amplification and emission of radiation therein, and a radiation element forming a part of the resonant cavity for directly forming an output radiation beam the amplitude of which has its transverse dependence substantially identical to said $J_m(\alpha\rho)$, the $m^{th}$ order Bessel function of the first kind from said resonant cavity, which results in the generation of the well-defined traveling wave radiation beam.

2. A system for generating a well defined traveling wave radiation beam as claimed in claim 1, said pumped resonant cavity comprising a laser cavity, which results in the generation of a well defined light beam.

3. A system for generating a well defined traveling wave radiation beam as claimed in claim 1, said pumping resonant cavity comprising a microwave cavity, which results in the generation of a well defined microwave beam.

4. A system for generating a well defined traveling wave radiation beam as claimed in claim 1, said radiation element comprising a circular annular reflector positioned at one end of said resonant cavity, and a focusing system having said circular annular reflector positioned in the focal plane of the focusing system, which results in the focusing system producing the well defined traveling wave radiation beam because the far field amplitude of an object is the Fourier transform thereof, and the Fourier transform of a circular function is the zero order Bessel function of the first kind.

5. A system for generating a well defined traveling wave radiation beam as claimed in claim 4, said focusing system being integrally formed with a partially reflecting surface which forms the opposite end of the resonant cavity from said circular annular reflector, and which focuses radiation transmitted by the partially reflecting surface to form the zero order Bessel function of the first kind output radiation beam.

6. A system for generating a well defined traveling wave radiation beam as claimed in claim 4, said focusing system comprising a focusing element positioned in the resonant cavity, and a partially reflecting surface forming the opposite end of the resonant cavity from said circular annular reflector, to allow transmission therethrough of radiation to form the zero order Bessel function of the first kind output radiation beam.

7. A system for generating a well defined traveling wave radiation beam as claimed in claim 4, said focusing system comprising a focusing element positioned outside the resonant cavity, and a partially reflecting surface forming the opposite end of the resonant cavity from said circular annular reflector, to allow transmission therethrough to said focusing element for formation of the zero order Bessel function of the first kind output radiation beam.

8. A system for generating a well defined traveling wave radiation beam as claimed in claim 4, wherein the mean diameter of the circular annular reflector is d, the width of the circular annular reflector is $\alpha d$, the radius of the output aperture formed by the radius of the focusing lens system is R, the focal length thereof is f, and the radiation has a wavelength $\lambda$, and wherein the $J_o$ beam produced in this manner has a spot parameter $\alpha=(2\pi/\lambda)\sin\theta$, where $\theta=\tan^{-1}(d/2f)$, wherein the modulation of the amplitude by the diffraction envelope of the annular reflector is negligible within the finite output aperture R by maintaining the width of the annular reflector $\alpha d<f/R$.

9. A system for generating a well defined traveling wave radiation beam as claimed in claim 1, wherein said generating means comprises a circular annular source of the radiation beam positioned in the focal plane of a focusing means, which results in the generation of the well defined radiation beam by the focusing means because the far field amplitude of an object is the Fourier transform thereof, and the Fourier transform of a circular line function is the zero order Bessel function of the first kind.

10. A system for generating a well defined traveling wave radiation beam as claimed in claim 1, wherein said radiation beam is generated with a transverse dependence of the zero order Bessel function of the first kind.

11. A system for generating a well defined traveling wave beam as defined in claim 1, wherein said generating means includes a focusing means located outside of the said resonant cavity.

12. A system for generating a well defined traveling wave radiation beam as claimed in claim 1, said resonant cavity having first and second reflective surfaces at opposite ends of the resonant cavity.

13. A system for generating a well defined traveling wave radiation beam as claimed in claim 12, said radiation element comprising one of the end reflective surfaces of the resonant cavity which has a circular annular aperture therein, and a focusing system having said circular annular aperture positioned in the focal plane of the focusing system, which results in the focusing system producing the well defined traveling wave radiation beam because the far field amplitude of an object is the Fourier transform thereof, and the Fourier transform of a circular function is the zero order Bessel function of the first kind.

14. A system for generating a well defined traveling wave radiation beam as claimed in claim 13, said circular annular aperture in one of the end reflective surfaces of the resonant cavity having a width d which is relatively narrow to sustain a Gaussian mode of operation in the cavity, and being of the order of one wavelength $\lambda$.

15. A system for generating a well defined traveling wave beam as defined in claim 12, wherein said generating means includes a focusing means located within said resonant cavity.

16. A system for generating a well defined traveling wave beam as defined in claim 15, wherein said second reflective surface comprises said focusing means.

* * * * *

UNITED STATES PATENT AND TRADEMARK OFFICE
CERTIFICATE OF CORRECTION

PATENT NO. : 4,887,885

DATED : December 19, 1989

INVENTOR(S) : James E. Durnin, et al.

It is certified that error appears in the above-identified patent and that said Letters Patent is hereby corrected as shown below:

Column 3, line 16: "subjects" should read as --subject--

Column 8, Equation 5, line 38: "...(r,t)..." should read as --...($\vec{r}$,t)...--

Column 8, Equation 5, line 40: "...$|\Psi(r)|^2$..." should read as --...$|\Psi(\vec{r})|^2$...--

Column 13, line 7: "bean" should read as --beam--

Column 14, line 1: "will essentially" should read as --will be essentially--

Column 14, line 2: "operation as" should read as --operation at--

Column 14, line 18: "may alternative" should read as --many alternative--

Column 14, lines 51 ar ld read as --pumped--

Signed and Sealed this

Ninth Day of April, 1991

*Attest:*

HARRY F. MANBECK, JR.

*Attesting Officer* *Commissioner of Patents and Trademarks*